Oct. 8, 1940.　　　　R. T. PALMER　　　　2,217,597
WET BULB THERMOSTATIC CONTROL
Filed Feb. 18, 1939
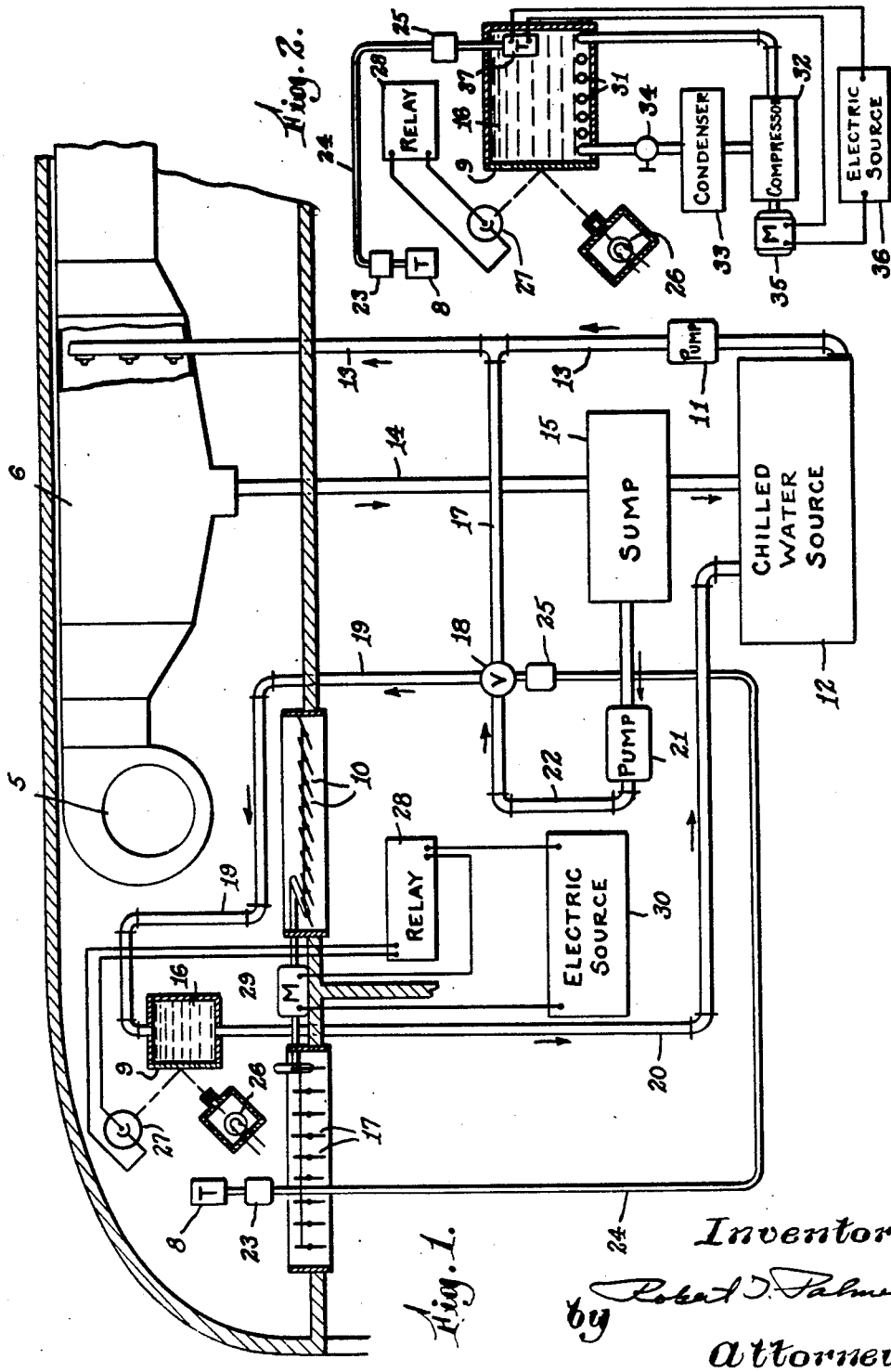
Inventor
Robert T. Palmer
by
Attorney Patented Oct. 8, 1940

2,217,597

UNITED STATES PATENT OFFICE 2,217,597

WET BULB THERMOSTATIC CONTROL

Robert T. Palmer, Sharon, Mass., assignor to B. F. Sturtevant Company, Hyde Park, Boston, Mass.

Application February 18, 1939, Serial No. 257,209

8 Claims. (Cl. 236—44)

This invention relates to thermostats and relates more particularly to wet bulb thermostats.

Wet bulb thermostats heretofore have either been of the type which includes a thermometer with a wetted wick around its bulb or of the differential type combining a hygrostat adjusted by a dry bulb thermostat to respond to wet bulb temperatures. The wick type thermostat has been unsatisfactory chiefly because of the difficulty of maintaining an adequate supply of clean water to the wick. The differential type is delicate and difficult to maintain in adjustment.

This invention provides wet bulb thermostats which are electrical and which do not depend upon evaporative or hygroscopic actions. In a preferred embodiment, a light source projects a beam of light reflected by a mirror upon a photoelectric surface. The mirror is in the air which is to actuate the thermostat.

When acting as a wet bulb thermostat, an associated dry bulb thermostat exposed to the same air, adjusts the temperature of a fluid acting to cool the back of a mirror, to follow dry bulb temperature changes so that when the wet bulb temperature of the air rises above the control temperature, moisture from the air condenses upon the mirror to interrupt the reflected light reaching the photo-electric cell causing it to actuate the controls.

An object of the invention is to provide an improved wet bulb thermostat.

The invention will now be described with reference to the drawing, of which:

Fig. 1 is a diagrammatic view of one embodiment of the invention included in an air conditioning system for a railway passenger car, and Fig. 2 is a diagrammatic view of another embodiment of the invention including its own refrigeration plant.

In railway car conditioning systems, for example, it is desired to convert an air washer system from refrigerative cooling to evaporative cooling when the wet bulb temperature is at or below say 65° F., and to convert the system from evaporative cooling to refrigerative cooling when the wet bulb temperature is above 65° F. A wet bulb thermostat in the outdoor air stream usually adjusts the dampers to 100% outdoor air when the wet bulb temperature is at or below the desired control temperature, and adjusts the dampers to about 25% outdoor air and 75% recirculated air when the wet bulb is above the control temperature.

For a 65° F. wet bulb temperature, a psychrometric chart shows the following:

| Dew point temperatures | Dry bulb temperatures |
|---|---|
| ° F. | ° F. |
| 56 | 80 |
| 53 | 85 |
| 49 | 90 |
| 45 | 95 |

When the wet bulb temperature rises above 65° F., then moisture will condense at the above dew point temperatures for the respective dry bulb temperatures given above. If therefore, a mirror surface is chilled to temperatures just below the dew point temperature corresponding to the dry bulb temperature and 65° wet bulb, moisture will condense out of the air upon it when the wet bulb temperature of the air rises above 65° F. According to this invention, a dry bulb thermostat adjusts a thermostat controlling the temperature at the mirror surface to cause it to be chilled to temperatures just below the dew point temperature for 65° F. wet bulb temperature and the prevailing dry bulb temperature.

In Fig. 1, outdoor air drawn in by the blower 5 for supply to the air cooler 6, passes between the shutters 7 in contact with the dry bulb thermostat 8 and the mirror surface 9. Recirculated air from the passenger space passes through the shutters 10 into the blower 5.

The pump 11 draws chilled water from the source 12 and supplies it through the pipe 13 to the air washer 6. The water is recirculated from the washer through the pipe 14 and sump 15 to the source 12 for recooling.

The mirror surface 9 forms one side of a compartment 16 through which chilled water from the source is circulated by the pump 11 through pipes 13 and 17, mixing valve 18 and pipe 19, the water from the compartment 16 returning through the pipe 20 to the source 12. The pump 21 draws warm water from the sump 15 and supplies it through the pipe 22 to the mixing valve 18 where it mixes with the chilled water from the source 12, for supply through the pipe 19 to the compartment 16. The mixing valve 18 is of the well known type containing a thermostat for adjusting orifices connecting with its two inlets for controlling the mixture of the water within the valve for maintaining the leaving water at the desired temperature.

The dry bulb thermostat 8 adjusts the bellows 23 which is connected by the tubing 24 to the bellows 25 which adjusts the thermostat in the valve 18. The bellows 23, tubing 24 and bellows 25 contain a liquid and operate hydraulically as is well known. As the dry bulb temperature of the outdoor air changes, the thermostat 23 adjusts the thermostat in the valve 18 to cause it to mix the chilled water from the source 12 and the warm water from the sump 15 in the correct proportions for causing the temperature of the water in the compartment 16 to be about a fourth of a degree below the dew point temperature shown by standard psychrometric charts for 65° F. and the prevailing dry bulb temperature.

If the wet bulb temperature of the outdoor air rises appreciably above 65° F., moisture will condense upon the outer surface of the mirror 9 and will interrupt the light beam from the light source, reflected by the mirror upon the photo-electric cell 27. The cell 27 then acts to deenergize the relay 28 causing it to open its contacts to disconnect the shutter control motor 29 from the electric source 30. This causes the motor to shift the dampers from 100% outdoor air to 75% recirculated air and 25% outdoor air by partially closing the shutters 7 and by partially opening the shutters 10.

When the wet bulb temperature of the outdoor air drops to or below 65° F., the moisture on the mirror is wiped and dried off by the air passing it and the photo-electric cell is again actuated to energize the relay 28 to cause it to close the energizing circuit of the motor 29 to cause it to again adjust the shutters for 100% outdoor air.

The embodiment of the invention described in the foregoing, makes use of equipment which is now in use on air conditioned railway cars. Fig. 2 illustrates an embodiment which may be self contained as for use at isolated points where it would not be convenient or feasible to supply refrigeration from the source for the air cooler. Fig. 2 illustrates a small compressor-condenser arrangement which may be designed for use with the wet bulb thermostat of this invention. With reference now to Fig. 2, the compartment 16 contains the evaporator coils 31 which are connected to the compressor 32, condenser 33 and expansion valve 34. The thermostat 37 in the compartment 16 is connected in an electric circuit with the motor 35 which drives the compressor 32, and the electric source 36, and controls the temperature of the mirror 9 by starting and stopping the compressor.

The thermostat 37 is adjusted by the dry bulb thermostat through the intermediary of the bellows 23, tubing 24 and bellows 25, previously described to cause the thermostat 37 to operate the compressor to produce in the compartment 16, lower temperatures as the dry bulb temperature at 8 rises, and to discontinue the operation of the compressor as the dry bulb temperature falls, the thermostat 37 being adjusted by the thermostat 8 to cause it to maintain in the compartment 16, temperatures slightly below the dew point temperatures shown by standard psychrometric charts for 65° F. wet bulb temperature and different dry bulb temperatures. The compartment 16 of Fig. 2 could be air tight or filled with any suitable liquid.

The control temperature of 65° F., has been selected for purpose of illustration for the reason that it has proved satisfactory in a number of air conditioned railway passenger cars, and obviously the thermostat could be adjusted for any other temperature as required for the duty to be performed.

While several embodiments of the invention have been described for the purpose of illustration, it should be understood that the invention is not to be limited to the exact apparatus and arrangement of apparatus described, as many departures and modifications may be suggested to those skilled in the art, without departure from the spirit of the invention.

What is claimed is:

1. A wet bulb thermostat adapted to be mounted in an air stream comprising a moisture detecting surface, means for adjusting the temperature of said surface, means including a dry bulb thermostat adapted to be exposed to the air in said stream for adjusting said first mentioned means for maintaining said surface at a temperature approaching the dew point temperature of air for a predetermined wet bulb temperature and the prevailing dry bulb temperature, and means for detecting the condensation of moisture upon said surface.

2. A wet bulb thermostat adapted to be mounted in an air stream comprising a moisture detecting surface, means for adjusting the temperature of said surface, means including a dry bulb thermostat adapted to be exposed to the air in said stream for adjusting said first mentioned means for maintaining said surface at a temperature approaching the dew point temperature of air for a predetermined wet bulb temperature and the prevailing dry bulb temperature, means for detecting the condensation of moisture upon said surface, and control means actuated by said detecting means.

3. A wet bulb thermostat adapted to be mounted in an air stream comprising a moisture detecting surface, means for adjusting the temperature of said surface, means including a dry bulb thermostat adapted to be exposed to the air in said stream for adjusting said first mentioned means for maintaining said surface at a temperature approaching the dew point temperature of air for a predetermined wet bulb temperature and the prevailing dry bulb temperature, and control means actuated by moisture upon said surface.

4. A wet bulb thermostat adapted to be mounted in an air stream comprising a moisture detecting surface, means for adjusting the temperature of said surface, means including a dry bulb thermostat adapted to be exposed to the air in said stream for adjusting said first mentioned means for maintaining said surface at a temperature approaching the dew point temperature or the air for a predetermined wet bulb temperature and the prevailing dry bulb temperature, and means including a photo-electric cell for detecting the condensation of moisture upon said surface.

5. A wet bulb thermostat adapted to be mounted in an air stream comprising a moisture detecting mirror, means for adjusting the temperature of said mirror, means including a dry bulb thermostat adapted to be exposed to the air in said stream for adjusting said first mentioned means for maintaining said mirror at a temperature approaching the dew point temperature of the air for a predetermined wet bulb temperature and the prevailing dry bulb temperature, and means including a photo-electric cell for detecting the condensation of moisture upon said mirror.

6. A wet bulb thermostat adapted to be mounted in an air stream comprising a moisture detecting surface, means for adjusting the temperature of said surface, means including a dry bulb thermostat adapted to be exposed to the air in said stream for adjusting said first mentioned means for maintaining said surface at a temperature approaching the dew point temperature of the air for a predetermined wet bulb temperature and the prevailing dry bulb temperature, means including a photo-electric cell for detecting the condensation of moisture upon said surface, and control means actuated by said last mentioned means.

7. A wet bulb thermostat adapted to be mounted in an air stream comprising a moisture detecting mirror, means for adjusting the temperature of said mirror, means including a dry bulb thermostat adapted to be exposed to the air in said stream for adjusting said first mentioned means for maintaining said mirror at a temperature approaching the dew point temperature of the air for a predetermined wet bulb temperature and the prevailing dry bulb temperature, a lamp for projecting light upon said mirror, and means including a photo-electric cell exposed to light reflected by said mirror from said source for detecting the condensation of moisture upon said mirror.

8. A wet bulb thermostat adapted to be mounted in an air stream comprising a moisture detecting mirror, means for adjusting the temperature of said mirror, means including a dry bulb thermostat for adjusting said first mentioned means for maintaining said mirror at a temperature approaching the dew point temperature of air for a predetermined wet bulb temperature and the prevailing dry bulb temperature, a lamp for projecting light upon said mirror, means including a photo-electric cell exposed to light reflected by said mirror from said source for detecting the condensation of moisture upon said mirror, and control means actuated by said detecting means.

ROBERT T. PALMER.